(12) United States Patent
Hasegawa et al.

(10) Patent No.: US 11,447,852 B2
(45) Date of Patent: Sep. 20, 2022

(54) HIGH-STRENGTH GALVANIZED STEEL SHEET, HIGH-STRENGTH MEMBER, AND METHOD FOR PRODUCING HIGH-STRENGTH GALVANIZED STEEL SHEET

(71) Applicant: JFE STEEL CORPORATION, Tokyo (JP)

(72) Inventors: Hiroshi Hasegawa, Tokyo (JP); Yoshimasa Funakawa, Tokyo (JP); Hiromi Yoshitomi, Tokyo (JP); Yoichi Makimizu, Tokyo (JP); Yoshitsugu Suzuki, Tokyo (JP); Gentaro Takeda, Tokyo (JP); Yoshikazu Suzuki, Tokyo (JP); Yoshimasa Himei, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 1016 days.

(21) Appl. No.: 16/072,904

(22) PCT Filed: Jan. 26, 2017

(86) PCT No.: PCT/JP2017/002615
§ 371 (c)(1),
(2) Date: Jul. 26, 2018

(87) PCT Pub. No.: WO2017/131054
PCT Pub. Date: Aug. 3, 2017

(65) Prior Publication Data
US 2019/0040511 A1   Feb. 7, 2019

(30) Foreign Application Priority Data

Jan. 29, 2016 (JP) .............................. JP2016-015358

(51) Int. Cl.
*C23C 2/02* (2006.01)
*C23C 2/06* (2006.01)
(Continued)

(52) U.S. Cl.
CPC .................. *C23C 2/02* (2013.01); *C21D 9/46* (2013.01); *C22C 38/02* (2013.01); *C22C 38/04* (2013.01);
(Continued)

(58) Field of Classification Search
CPC ....................................................... C23C 2/02
See application file for complete search history.

(56) References Cited

U.S. PATENT DOCUMENTS

2003/0155048 A1   8/2003 Zeizinger et al.
2006/0124907 A1   6/2006 Takada et al.
(Continued)

FOREIGN PATENT DOCUMENTS

CN   1436252 A   8/2003
CN   1985016 B   9/2011
(Continued)

OTHER PUBLICATIONS

Aug. 26, 2019 Office Action issued in Korean Patent Application No. 10-2018-7021607.
(Continued)

*Primary Examiner* — Christopher S Kessler
(74) *Attorney, Agent, or Firm* — Oliff PLC

(57) ABSTRACT

A high-strength galvanized steel sheet having improved post-work impact resistance, a method for producing the high-strength galvanized steel sheet, and a high-strength member produced using the steel sheet. The high-strength galvanized steel sheet includes a steel sheet having a microstructure including ferrite and carbide-free bainite, martensite and carbide-containing bainite, and retained austenite, (Continued)

the total area fraction of ferrite and carbide-free bainite being 0% to 55%, the total area fraction of martensite and carbide-containing bainite being 45% to 100%, and the area fraction of retained austenite being 0% to 5%. Additionally, a galvanizing layer is disposed on the steel sheet. The density of gaps that cut across the entire thickness of the galvanizing layer in a cross section of the galvanizing layer, which is taken in the thickness direction so as to be perpendicular to the rolling direction, is 10 gaps/mm or more.

26 Claims, 1 Drawing Sheet

(51) Int. Cl.
  *C23C 2/40* (2006.01)
  *C21D 9/46* (2006.01)
  *C22C 38/06* (2006.01)
  *C22C 38/60* (2006.01)
  *C22C 38/02* (2006.01)
  *C22C 38/04* (2006.01)
  *C23C 2/26* (2006.01)
  *C23C 2/28* (2006.01)
  *C22C 38/34* (2006.01)
  *C22C 38/16* (2006.01)
  *C22C 38/08* (2006.01)
  *C22C 38/38* (2006.01)
  *C22C 38/12* (2006.01)
  *C22C 38/14* (2006.01)

(52) U.S. Cl.
  CPC .............. *C22C 38/06* (2013.01); *C22C 38/08* (2013.01); *C22C 38/12* (2013.01); *C22C 38/14* (2013.01); *C22C 38/16* (2013.01); *C22C 38/34* (2013.01); *C22C 38/38* (2013.01); *C22C 38/60* (2013.01); *C23C 2/06* (2013.01); *C23C 2/26* (2013.01); *C23C 2/28* (2013.01); *C23C 2/40* (2013.01); *C21D 2211/001* (2013.01); *C21D 2211/002* (2013.01); *C21D 2211/004* (2013.01); *C21D 2211/005* (2013.01); *C21D 2211/008* (2013.01); *C21D 2211/009* (2013.01); *Y02P 10/20* (2015.11)

(56) References Cited

U.S. PATENT DOCUMENTS

| | | |
|---|---|---|
| 2012/0222781 A1 | 9/2012 | Azuma et al. |
| 2013/0017411 A1 | 1/2013 | Hamada et al. |
| 2014/0193665 A1 | 7/2014 | Kawata et al. |
| 2016/0160310 A1 | 6/2016 | Hasegawa et al. |
| 2017/0314116 A1 | 11/2017 | Kawata et al. |

FOREIGN PATENT DOCUMENTS

| | | | |
|---|---|---|---|
| CN | 103717773 A | | 4/2014 |
| EP | 2 738 280 A1 | | 6/2014 |
| JP | H10-13081 A | | 1/1998 |
| JP | H10-130801 A | | 5/1998 |
| JP | 2001-11565 A | | 1/2001 |
| JP | 2011-214101 A | | 10/2011 |
| JP | 2012-031462 A | | 2/2012 |
| JP | 2015-151576 A | | 8/2015 |
| WO | 2011/065591 A1 | | 6/2011 |

OTHER PUBLICATIONS

Apr. 18, 2017 International Search Report issued in International Application No. PCT/JP2017/002615.
Feb. 3, 2020 Office Action issued in Chinese Patent Application No. 201780008501.6.
Jan. 22, 2019 Extended Search Report issued in European Patent Application No. 17744284.5.
Sep. 16, 2019 Office Action issued in Chinese Patent Application No. 201780008501.6.
Mar. 19, 2020 Office Action issued in Korean Patent Application No. 10-2018-7021607.
Jan. 28, 2020 Office Action issued in European Patent Application No. 17 744 284.5.
Feb. 2, 2022 Office Action issued in U.S. Appl. No. 16/473,377.
Sep. 17, 2021 Office Action issued in U.S. Appl. No. 16/473,377.

EXAMPLES OF CARBIDE IN BAINITE

GAPS IN PLATING LAYER

HIGH-STRENGTH GALVANIZED STEEL SHEET, HIGH-STRENGTH MEMBER, AND METHOD FOR PRODUCING HIGH-STRENGTH GALVANIZED STEEL SHEET

TECHNICAL FIELD

The present disclosure relates to a high-strength galvanized steel sheet and a high-strength member that are suitably used for producing automotive components and a method for producing the high-strength galvanized steel sheet.

BACKGROUND ART

Steel sheets used for producing automotive components have been required to have high strengths in order to improve the collision safety and the fuel economy of automobiles. Since an increase in the strength of a steel sheet commonly leads to the degradation of the workability of the steel sheet, the development of a steel sheet having a markedly high strength and excellent workability has been anticipated. In particular, high-strength steel sheets having a tensile strength (hereinafter, abbreviated as "TS") of more than 1180 MPa are required to have excellent bendability, because they are typically worked into rocker components and the like by primarily being bent. In addition, since the above components are used in a corrosive environment, steel sheets used for producing the above components are required to have high corrosion resistance. It is also important that steel sheets used for producing the above components have excellent impact resistance in order to protect vehicle occupants, which is one of the functions of the components.

PTL 1 discloses a technology relating to a hot-galvanized steel sheet having excellent bendability. PTL 2 discloses a technology relating to a hot-galvanized steel sheet having excellent impact resistance.

CITATION LIST

Patent Literature

PTL 1: Japanese Unexamined Patent Application Publication No. 2001-11565
PTL 2: Japanese Unexamined Patent Application Publication No. 2012-31462

SUMMARY

Technical Problem

The technology disclosed in PTL 1 has room for improvement, because the impact resistance and, in particular, the post-work impact resistance of the steel sheet are not taken into account in PTL 1. The post-work impact resistance of the steel sheet is also not taken into account in the technology described in PTL 2.

The present disclosure was made in order to address the above-described issues. An object of the present disclosure is to provide a high-strength galvanized steel sheet having improved post-work impact resistance, a method for producing the high-strength galvanized steel sheet, and a high-strength member produced using the steel sheet.

Solution to Problem

The inventors of the present disclosure conducted extensive studies in order to address the above issues and, as a result, found that the impact resistance of a plated steel sheet that has been worked into a component does not always vary with only the properties of the steel sheet but also greatly varies with the conditions of the plating layer. On the basis of the above findings, the inventors found that the above-described issues may be addressed by adjusting the composition of the steel sheet to be a specific composition, adjusting the microstructure of the steel sheet to be a specific microstructure, and adjusting the density of gaps that cut across the entire thickness of a galvanizing layer in a cross section of the galvanizing layer which is taken in the thickness direction so as to be perpendicular to the rolling direction to be a specific density. Thus, the present disclosure was made. More specifically, the exemplary embodiments of the present disclosure include the following.

[1] A high-strength galvanized steel sheet including a steel sheet having a composition containing, by mass, C: 0.05% to 0.30%, Si: 3.0% or less, Mn: 1.5% to 4.0%, P: 0.100% or less, S: 0.02% or less, and Al: 1.0% or less, with the balance including Fe and inevitable impurities, the steel sheet having a microstructure including ferrite and carbide-free bainite, martensite and carbide-containing bainite, and retained austenite, the total area fraction of ferrite and carbide-free bainite being 0% to 55%, the total area fraction of martensite and carbide-containing bainite being 45% to 100%, and the area fraction of retained austenite being 0% to 5%; and a galvanizing layer disposed on the steel sheet, wherein the density of gaps that cut across the entire thickness of the galvanizing layer in a cross section of the galvanizing layer, the cross section being taken in a thickness direction of the steel sheet so as to be perpendicular to a rolling direction of the steel sheet, is 10 gaps/mm or more.

[2] The high-strength galvanized steel sheet described in [1], wherein the composition further containing one or more elements selected from, by mass, Cr: 0.005% to 2.0%, Mo: 0.005% to 2.0%, V: 0.005% to 2.0%, Ni: 0.005% to 2.0%, Cu: 0.005% to 2.0%, Nb: 0.005% to 0.20%, Ti: 0.005% to 0.20%, B: 0.0001% to 0.0050%, Ca: 0.0001% to 0.0050%, REM: 0.0001% to 0.0050%, Sb: 0.0010% to 0.10%, and Sn: 0.0010% to 0.50%.

[3] The high-strength galvanized steel sheet described in [1] or [2], wherein the density of carbide particles having an equivalent circle diameter of 0.5 μm or more in a region of the steel sheet, the region extending from a surface of the steel sheet to a depth of 10 μm in the thickness direction, is $10^5$ particles/mm² or less.

[4] The high-strength galvanized steel sheet described in any one of [1] to [3], wherein the galvanizing layer is an alloyed galvanizing layer.

[5] A high-strength member including a bent portion formed by bending the high-strength galvanized steel sheet described in any one of [1] to [4], wherein a Vickers hardness HV of the bent portion at a position 50 μm from a surface of the steel sheet in a thickness direction of the steel sheet, the Vickers hardness HV being measured by the measurement method below, is 350 or more, and wherein the density of gaps that cut across the entire thickness of the galvanizing layer in a cross section of the bent portion, the cross section being taken in the thickness direction of the steel sheet so as to be perpendicular to a rolling direction of the steel sheet, is 50 gaps/mm or more.

(Measurement Method)

A sample is taken from the bent portion at a position that is the center of a ridge line of the bent portion in a width direction. A Vickers hardness of the sample at a position 50 μm from the surface of the steel sheet in the thickness direction is measured with a load of 50 gf for 5 points in a cross section of the sample, the cross section being taken in the thickness direction so as to be perpendicular to the ridge line. The average of the three Vickers hardness values other than the maximum or minimum is calculated.

[6] A method for producing a high-strength galvanized steel sheet, the method including: an annealing step in which a hot-rolled or cold-rolled steel sheet having the composition described in [1] or [2] is heated at a heating temperature of 750° C. or more and subsequently cooled such that an average cooling rate in a temperature range of 550° C. to 700° C. is 3° C./s or more, the amount of residence time during which the steel sheet is maintained at 750° C. or more during the heating and the cooling being 30 seconds or more; a galvanizing step in which, subsequent to the annealing step, the annealed steel sheet is galvanized and subsequently, as needed, subjected to an alloying treatment; and a bending-unbending step in which the galvanized steel sheet is bent and unbent in a direction perpendicular to a rolling direction of the steel sheet at a bend radius of 500 to 1000 mm in a temperature range of Ms to Ms −200° C. during cooling performed subsequent to the galvanizing step, each of the bending and the unbending being performed once or more, and the steel sheet is subsequently cooled to 50° C. or less.

[7] The method for producing a high-strength galvanized steel sheet described in [6], the method further including: a temper rolling step in which, subsequent to the bending-unbending step, temper rolling is performed; and a second bending-unbending step in which, subsequent to the temper rolling, the steel sheet is bent and unbent in a direction perpendicular to the rolling direction at a bend radius of 500 mm or less, each of the bending and the unbending being performed 3 times or more.

[8] The method for producing a high-strength galvanized steel sheet described in [6] or [7], wherein, in the annealing step, the $H_2O$ concentration in a furnace atmosphere in a temperature range of 750° C. to 900° C. is 500 to 5000 ppm.

Advantageous Effects

The high-strength galvanized steel sheet according to the present disclosure may be worked into a product, such as a component, having excellent impact resistance.

DESCRIPTION OF EMBODIMENTS

Figure 1:
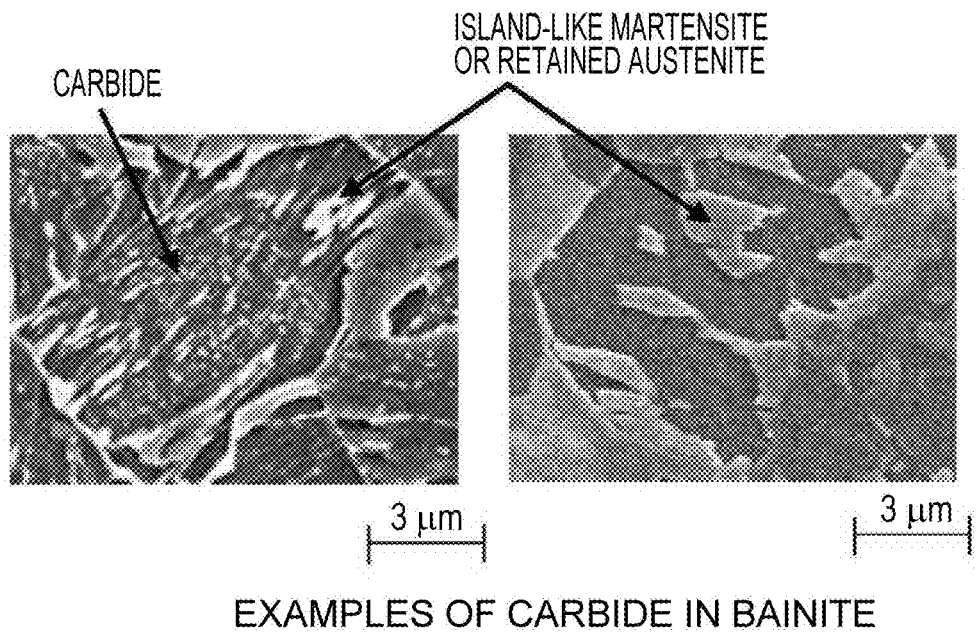
FIG. 1 includes diagrams illustrating carbide-containing bainite (a) and carbide-free bainite (b).

An exemplary embodiment of the present disclosure is described below. The present disclosure is not limited by the following embodiment.
<High-Strength Galvanized Steel Sheet>

The high-strength galvanized steel sheet according to the present disclosure includes a steel sheet and a galvanizing layer formed on the steel sheet. First, the steel sheet is described. The galvanizing layer is described subsequent to the description of the steel sheet.

The steel sheet has a specific composition and a specific microstructure. In the description of the steel sheet, the composition of the steel sheet and the microstructure of the steel sheet are described in this order.

The composition of the steel sheet included in the high-strength galvanized steel sheet according to the present disclosure contains, by mass, C: 0.05% to 0.30%, Si: 3.0% or less, Mn: 1.5% to 4.0%, P: 0.100% or less, S: 0.02% or less, and Al: 1.0% or less, with the balance including Fe and inevitable impurities.

The composition of the steel sheet may further contain one or more elements selected from, by mass, Cr: 0.005% to 2.0%, Mo: 0.005% to 2.0%, V: 0.005% to 2.0%, Ni: 0.005% to 2.0%, Cu: 0.005% to 2.0%, Nb: 0.005% to 0.20%, Ti: 0.005% to 0.20%, B: 0.0001% to 0.0050%, Ca: 0.0001% to 0.0050%, REM: 0.0001% to 0.0050%, Sb: 0.0010% to 0.10%, and Sn: 0.0010% to 0.50%. Each of the above constituents is described below. The symbol "%" denotes "% by mass" when referring to the content of a constituent.
C: 0.05% to 0.30%

C is an element that causes the formation of martensite and carbide-containing bainite and thereby effectively increases the TS of the steel sheet. If the C content is less than 0.05%, the above advantageous effects may fail to be achieved sufficiently. Consequently, a TS of 1180 MPa or more may fail to be achieved. In another case, the Vickers hardness HV of the bent portion at a position 50 μm from the surface in the thickness direction of the steel sheet may fail to be 350 or more. If the C content exceeds 0.30%, hardening of martensite may occur, which significantly degrades the bendability of the steel sheet. Furthermore, the impact resistance of the steel sheet may become degraded. Accordingly, the C content is limited to be 0.05% to 0.30%. The minimum C content is preferably 0.06% or more and is more preferably 0.07% or more. The maximum C content is 0.25% or less and is more preferably 0.20% or less.
Si: 3.0% or Less (Excluding 0%)

Si is an element that causes the solid-solution strengthening of steel and thereby effectively increases the TS of the steel sheet. If the Si content exceeds 3.0%, the impact resistance of the steel sheet may become degraded. Accordingly, the Si content is limited to be 3.0% or less, is preferably 2.5% or less, and is more preferably 2.0% or less. The minimum Si content is not limited and normally 0.01% or more.
Mn: 1.5% to 4.0%

Mn is an element that causes the formation of martensite and carbide-containing bainite and thereby effectively increases the TS of the steel sheet. If the Mn content is less than 1.5%, the above advantageous effects may fail to be achieved sufficiently. If the Mn content is less than 1.5%, ferrite and carbide-free bainite, which are not preferable in the present disclosure, may be formed. Consequently, a TS of 1180 MPa or more may fail to be achieved. In another case, the Vickers hardness HV of the bent portion at a position 50 μm from the surface in the thickness direction of the steel sheet may fail to be 350 or more. If the Mn content exceeds 4.0%, the impact resistance of the steel sheet may become degraded. Accordingly, the Mn content is limited to be 1.5 to 4.0% or less. The minimum Mn content is preferably 2.0% or more. The maximum Mn content is preferably 3.5% or less.
P: 0.100% or Less (Excluding 0%)

Since P may degrade the impact resistance of the steel sheet, it is desirable to reduce the P content to a minimum level. The P content allowable in the present disclosure is 0.100% or less. The minimum P content is not specified but is preferably 0.001% or more, because the efficiency of production of the steel sheet may be reduced if the P content is less than 0.001%.
S: 0.02% or Less (Excluding 0%)

Since S may degrade the impact resistance of the steel sheet, it is preferable to reduce the S content to a minimum level. The S content allowable in the present disclosure is 0.02% or less. The minimum S content is not specified but is preferably 0.0005% or more, because the efficiency of production of the steel sheet may be reduced if the S content is less than 0.0005%.

Al: 1.0% or Less (Excluding 0%)

Al serves as a deoxidizing agent and is preferably used in a deoxidation process. In order to use Al as a deoxidizing agent, the Al content is preferably 0.01% or more. Addition of an excessive amount of Al may cause ferrite and carbide-free bainite, which are not preferable in the present disclosure, to be formed in large amounts. In such a case, it may become not possible to achieve both excellent impact resistance and a TS of 1180 MPa or more or a Vickers hardness HV of 350 or more, the Vickers hardness being the Vickers hardness of the bent portion at a position 50 μm from the surface in the thickness direction of the steel sheet. The Al content allowable in the present disclosure is 1.0% or less. The Al content is preferably 0.50% or less.

The balance of the composition of the steel sheet includes Fe and inevitable impurities. The composition of the steel sheet may optionally contain one or more elements selected from Cr: 0.005% to 2.0%, Mo: 0.005% to 2.0%, V: 0.005% to 2.0%, Ni: 0.005% to 2.0%, Cu: 0.005% to 2.0%, Nb: 0.005% to 0.20%, Ti: 0.005% to 0.20%, B: 0.0001% to 0.0050%, Ca: 0.0001% to 0.0050%, REM: 0.0001% to 0.0050%, Sb: 0.0010% to 0.10%, and Sn: 0.0010% to 0.50%.

Cr, Ni, and Cu are effective elements that cause the formation of martensite and carbide-containing bainite and thereby increase the strength of the steel sheet. In order to achieve the above advantageous effects, the content of each of the above elements is preferably set to be within the above range. If the content of each of Cr, Ni, and Cu exceeds the above upper limit, the impact resistance of the steel sheet may become degraded. The minimum contents of Cr, Ni, and Cu are preferably 0.05% or more. The maximum contents of Cr, Ni, and Cu are preferably 0.7% or less.

Mo, V, Nb, and Ti are elements that cause the formation of carbides and effectively increase the strength of the steel sheet by precipitation strengthening. In order to achieve the above advantageous effects, the content of each of the above elements is preferably set to be within the above range. If the content of each of Mo, V, Nb, and Ti exceeds the above upper limit, the size of carbide particles may be increased and, consequently, the certain impact resistance required in the present disclosure may fail to be achieved. The minimum contents of Mo, V, Nb, and Ti are preferably 0.01% or more. The maximum contents of Nb and Ti are preferably 0.05% or less. The maximum contents of Mo and V are preferably 0.5% or less.

B is an effective element that enhances the hardenability of the steel sheet, causes the formation of martensite and carbide-containing bainite, and thereby increases the strength of the steel sheet. In order to achieve the above advantageous effects, the B content is preferably set to 0.0001% or more. However, if the B content exceeds 0.0050%, the amount of inclusions may be increased and the bendability of the steel sheet may become degraded accordingly. The minimum B content is preferably 0.0005% or more. The maximum B content is preferably 0.0040% or less.

Ca and REM are elements that effectively enhance the impact resistance of the steel sheet by controlling the morphology of inclusions. In order to achieve the above advantageous effects, the contents of Ca and REM are preferably set to be within the respective ranges. If the contents of Ca and REM exceed the respective upper limits above, the amount of inclusions may be increased and the bendability of the steel sheet may become degraded accordingly. The minimum contents of Ca and REM are preferably 0.0005% or more. The maximum contents of Ca and REM are preferably 0.0040% or less.

Sn and Sb are elements that suppress the removal of nitrogen, boron, and the like and thereby effectively limit a reduction in the strength of steel. In order to achieve the above advantageous effects, the contents of Sn and Sb are preferably set to be within the above respective ranges. If the contents of Sn and Sb exceed the respective upper limits, the impact resistance of the steel sheet may become degraded. The minimum contents of Sn and Sb are preferably 0.010% or more. The maximum contents of Sn and Sb are preferably 0.10% or less.

Setting the contents of Cr, Mo, V, Ni, Cu, Nb, Ti, B, Ca, REM, Sn, and Sb to be less than the respective lower limits does not impair the advantageous effects of the present disclosure. Therefore, when the contents of the above elements are less than the respective lower limits, it is considered that the above elements serve as inevitable impurities contained in the composition of the steel sheet.

In the present disclosure, the composition of the steel sheet may contain inevitable impurity elements such as Zr, Mg, La, and Ce at a content of 0.002% or less in total. The composition of the steel sheet may also contain N at a content of 0.008% or less as an inevitable impurity.

The microstructure of the high-strength galvanized steel sheet according to the present disclosure is described below. The microstructure includes ferrite and carbide-free bainite, martensite and carbide-containing bainite, and retained austenite. The total area fraction of ferrite and carbide-free bainite is 0% to 55%. The total area fraction of martensite and carbide-containing bainite is 45% to 100%. The area fraction of retained austenite is 0% to 5%.

Total Area Fraction of Ferrite and Carbide-Free Bainite: 0% to 55%

The microstructure of the steel sheet includes ferrite and carbide-free bainite in appropriate amounts in order to enhance the ductility of the steel sheet. However, if the total area fraction of ferrite and carbide-free bainite exceeds 55%, the desired strength of the steel sheet may fail to be achieved. Accordingly, the total area fraction of ferrite and carbide-free bainite is limited to be 0% to 55% and is preferably 0% to 50%. It is considered that bainite does not contain carbide in the case where the presence of carbide particles is not confirmed in an image of the steel sheet captured by the following method: grinding a cross section of the steel sheet which is taken in the thickness direction so as to be parallel to the rolling direction, subsequently performing corrosion with 3% nital, and capturing an image of the cross section at a position 1/4 from the surface in the thickness direction with a SEM (scanning electron microscope) at 1500-fold magnification. As illustrated in FIG. 1, carbide particles appear as white portions having a dot-like or a linear shape in the image. Examples of the carbide include iron-based carbides, such as cementite, Ti-based carbides, and Nb-based carbides. The above area fraction is determined by the method described in Examples below.

Total Area Fraction of Martensite and Carbide-Containing Bainite: 45% to 100%

Martensite and carbide-containing bainite are microstructure components necessary for achieving the certain TS and impact resistance required in the present disclosure. The above advantageous effects may be achieved when the total area fraction of martensite and carbide-containing bainite is 45% or more. Accordingly, the total area fraction of martensite and carbide-containing bainite is limited to be 45% to 100%. It is considered that bainite includes carbide in the case where the presence of carbide particles is confirmed in an image of the steel sheet captured by the following method: grinding a cross section of the steel sheet which is taken in the thickness direction so as to be parallel to the rolling direction, subsequently performing corrosion with 3% nital, and capturing an image of the cross section at a position 1/4 from the surface in the thickness direction with a SEM (scanning electron microscope) at 1500-fold magnification. The above area fraction is determined by the method described in Examples below.

Area Fraction of Retained Austenite: 0% to 5%

Although it is not preferable that the microstructure of the steel sheet according to the present disclosure include retained austenite, the microstructure may include retained austenite such that the area fraction of retained austenite is 5% or less. If the area fraction of retained austenite exceeds 5%, the impact resistance of the steel sheet may become degraded. Accordingly, the area fraction of retained austenite is limited to be 0% to 5% and is preferably 0% to 3%. The above area fraction is determined by the method described in Examples below.

Examples of phases other than the above phases include pearlite. The microstructure of the steel sheet may include pearlite such that the area fraction of pearlite is 10% or less.

Density of Carbide Particles Having Size (Equivalent Circle Diameter) of 0.5 μm or More: $10^5$ Particles/mm$^2$ or Less In the present disclosure, it is preferable to limit the density of carbide particles having a size of 0.5 μm or more in a region of the steel sheet which extends from the surface to a depth of 10 μm in the thickness direction to be $10^5$ particles/mm$^2$ or less. When the above condition is satisfied, the impact resistance of the steel sheet may be further enhanced. The minimum density of the carbide particles is preferably $0.05 \times 10^5$ particles/mm$^2$ or more. The term "size" used herein refers to the diameter of an equivalent circle having the same area as a carbide particle. The methods for determining the size and density of carbide particles are as described in Examples below.

The galvanizing layer is described below. The density of gaps that extend from the surface of the galvanizing layer in the thickness direction and cut across the entire thickness of the galvanizing layer in a cross section of the galvanizing layer which is taken in the thickness direction so as to be perpendicular to the rolling direction, the density being measured in the width direction (hereinafter, this density may be referred to as "gap density"), is 10 gaps/mm or more.

If the above gap density is less than 10 gaps/mm, the bendability and the post-work impact resistance of the steel sheet may become degraded. Accordingly, the density of gaps that cut across the entire thickness of the galvanizing layer in a cross section of the galvanizing layer which is taken in the thickness direction so as to be perpendicular to the rolling direction is limited to be 10 gaps/mm or more. The above gap density is preferably 100 gaps/mm or less, because the powdering property of the steel sheet may become degraded if the above gap density exceeds 100 gaps/mm. The term "gaps that cut across the entire thickness of the galvanizing layer" refers to gaps both ends of which reach the respective ends of the galvanizing layer in the thickness direction. The above gap density is measured as in Examples below.

The galvanizing layer is a layer formed by a common plating method. Examples of the galvanizing layer include an alloyed galvanizing layer formed by performing an alloying treatment. The composition of the galvanizing layer preferably contains 0.05% to 0.25% Al with the balance including zinc and inevitable impurities.

<High-Strength Member>

The high-strength member according to the present disclosure includes a bent portion formed by bending the above high-strength galvanized steel sheet according to the present disclosure. The term "bend" used herein refers to a process in which the steel sheet is bent, for example, under the following conditions: the ratio of R (bend radius)/t (thickness): 1 to 5, bend angle: 60° to 90°, bend temperature: 100° C. or less, where R refers to the inner R of the bent portion.

The Vickers hardness HV of the bent portion at a position 50 μm from the surface in the thickness direction is 350 or more. If the above Vickers hardness HV is less than 350, the steel sheet according to the present disclosure may fail to have the high strength. The maximum Vickers hardness HV is not limited but is preferably 600 or less, because delayed fracture may occur if the Vickers hardness HV exceeds 600. The bend radius of the bent portion is not limited but is preferably 20 mm or less. The method for bending the steel sheet is not limited; stretch bending and multi-cycle bending may be used. The Vickers hardness HV is determined by the method described in Examples below.

The density of gaps that cut across the entire thickness of the galvanizing layer in a cross section of the bent portion which is taken in the thickness direction so as to be perpendicular to the rolling direction is 50 gaps/mm or more. Setting the gap density to 50 gaps/mm or more may enhance the impact resistance of the high-strength member. Although the mechanism by which the impact resistance of the high-strength member becomes enhanced is not clear, this is presumably because the concentration of stress at the edges of the gaps in the steel sheet is reduced. The above advantageous effects are not achieved if the gap density is less than 50 gaps/mm. The above gap density is preferably 500 gaps/mm or less, because the powdering property of the high-strength member may become degraded if the above gap density exceeds 500 gaps/mm. As described above, the term "gaps that cut across the entire thickness of the galvanizing layer" refers to gaps both ends of which reach the respective ends of the galvanizing layer in the thickness direction.

<Method for Producing High-Strength Galvanized Steel Sheet>

The method for producing the high-strength galvanized steel sheet according to the present disclosure includes an annealing step, a galvanizing step, and a bending-unbending step.

The annealing step is a step in which heating is performed at a heating temperature of 750° C. or more and cooling is subsequently performed such that the average cooling rate in the temperature range of 550° C. to 700° C. is 3° C./s or more. The amount of residence time during which the temperature is maintained to be 750° C. or more during the heating and the cooling is 30 seconds or more.

The method for preparing the hot-rolled or cold-rolled steel sheet is not limited. The slab used for preparing the hot-rolled or cold-rolled steel sheet is preferably produced by continuous casting in order to prevent macrosegregation. Ingot casting and thin-slab casting may alternatively be used for preparing the slab. When the slab is hot-rolled, the slab may be cooled to room temperature and subsequently reheated prior to the hot rolling. In another case, the slab may be charged into a heating furnace without being cooled to room temperature before hot rolling. Alternatively, an energy-saving process in which the slab is hot-rolled immediately after heat insulation has been performed for a small amount of time may also be used. When the slab is heated, it is preferable to heat the slab to 1100° C. or more in order to dissolve carbide and prevent an increase in the rolling load. The slab-heating temperature is preferably 1300° C. or less in order to prevent an increase in scale loss. The slab-heating temperature is the temperature of the surface of the slab. Hot-rolling of the slab may be performed by heating rough-rolled steel bars. Alternatively, rough-rolled steel bars joined to one another may be subjected to continuous finish rolling. That is, a "continuous rolling process" may be used. The finish rolling is preferably performed with a finishing temperature equal to or higher than the $Ar_3$ transformation temperature in order to prevent an increase in anisotropy, which may lead to the degradation of the workability of the cold-rolled and annealed steel sheet. It is preferable to perform lubricated rolling with a coefficient of friction of 0.10 to 0.25 in all or a part of the passes of the finish rolling in order to reduce the rolling load and variations in shape and quality of the steel sheet. Subsequent to the hot rolling, the steel sheet is coiled and scale is removed by pickling or the like. Subsequently, a heat treatment and cold-rolling may be performed as needed.

Heating Temperature (Annealing Temperature): 750° C. or More

If the annealing temperature is less than 750° C., the formation of austenite may become insufficient. Since austenite formed by annealing is converted into martensite or bainite (both carbide-containing bainite and carbide-free bainite) in the final microstructure by bainite transformation or martensite transformation, insufficient formation of austenite results in failure to produce a steel sheet having the desired microstructure. Accordingly, the annealing temperature is limited to be 750° C. or more. The maximum annealing temperature is not limited but is preferably 950° C. or less in consideration of ease of operation and the like.

$H_2O$ Concentration: 500 to 5000 ppm

In the annealing step, the $H_2O$ concentration in the atmosphere of the furnace in the temperature range of 750° C. to 900° C. is preferably set to 500 to 5000 ppm. In such a case, the carbon content in the vicinity of the surface of the steel sheet may be reduced. This makes it possible to set the density of carbide particles having a size of 0.5 μm or more in the region of the steel sheet which extends from the surface to a depth of 10 μm in the thickness direction to be $10^5$ particles/mm$^2$ or less and thereby enhance the impact resistance of the steel sheet.

Average Cooling Rate in Temperature Range of 550° C. to 700° C.: 3° C./s or More If the average cooling rate in the temperature range of 550° C. to 700° C. is less than 3° C./s, a large amount of ferrite and carbide-free bainite may be formed, that is, the area fraction of ferrite and carbide-free bainite exceeds 55%, and consequently, the desired microstructure may fail to be formed. Accordingly, the average cooling rate in the temperature range of 550° C. to 700° C. is limited to be 3° C./s or more. The maximum average cooling rate is not limited but is preferably 500° C./s or less in consideration of ease of operation and the like.

After the cooling, reheating may be performed at a heating temperature of Ms to 600° C. such that the amount of residence time during which the temperature is maintained to be Ms to 600° C. is 1 to 100 seconds.

Residence Time: 30 Seconds or More

If the amount of residence time (i.e., annealing holding time) during which the temperature is maintained to be 750° C. or more during the heating and cooling is less than 30 seconds, the formation of austenite may become insufficient and, consequently, the above steel sheet may fail to have the desired microstructure. Accordingly the anneal holding time is limited to be 30 seconds or more. The maximum amount of residence time is not limited but is preferably 1000 seconds or less in consideration of ease of operation and the like.

Although the temperature at which the steel sheet is maintained until the plating layer is deposited on the steel sheet and the amount of time during which the steel sheet is maintained until the plating layer is deposited on the steel sheet are not limited, the temperature at which the steel sheet is maintained until the plating layer is deposited on the steel sheet is preferably 350° C. or more, because the microstructure of the steel sheet needs to include austenite after the steel sheet has been galvanized or alloyed.

The galvanizing step is a step in which, subsequent to the annealing step, the annealed steel sheet is galvanized and subsequently alloyed as needed. For example, a plating layer having a composition containing, by mass, Fe: 0% to 20.0%, Al: 0.001% to 1.0%, and one or more elements selected from Pb, Sb, Si, Sn, Mg, Mn, Ni, Cr, Co, Ca, Cu, Li, Ti, Be, Bi, and REM: 0% to 30% in total, with the balance including Zn and inevitable impurities is formed on the surface of the annealed steel sheet after the steel sheet has been cooled. The method for performing the plating process is not limited; common plating methods, such as hot-dip galvanizing and electrogalvanizing, may be used. The conditions under which the plating process is performed may be set appropriately. Subsequent to the hot-dip galvanizing of the steel sheet, the steel sheet may be heated in order to perform an alloying treatment. The heating temperature at which the alloying treatment is performed is preferably, but not limited to, 460° C. to 600° C.

The bending-unbending step is a step in which the galvanized steel sheet is bent and unbent in a direction perpendicular to the rolling direction at a bend radius of 500 to 1000 mm in a temperature range of Ms to Ms −200° C. during cooling performed subsequent to the galvanizing step, each of the bending and the unbending being performed once or more, and the steel sheet is subsequently cooled to 50° C. or less.

Gaps that extend across the entire thickness of the galvanizing layer (i.e., gaps that cut across the entire thickness of the galvanizing layer) are formed during cooling performed subsequent to the galvanizing of the steel sheet or galvanizing and alloying of the steel sheet in order to reduce the residual stress resulting from the difference in expansion coefficient between the galvanizing layer and the steel sheet. In the case where the composition of the steel sheet contains austenite, the steel sheet becomes swollen as a result of martensite transformation when the temperature reaches the Ms point or less and, consequently, the manner in which the gaps are formed in the galvanizing layer is changed. The manner in which the gaps are formed in the galvanizing layer may also change by controlling the tensile stress applied to the surface when the steel sheet is bent. Performing the above treatment within the above range, that is, bending and unbending the steel sheet at a bend radius of 500 to 1000 mm in a temperature range of Ms to Ms −200° C., each of the bending and the unbending being repeated once or more (preferably 2 to 10 times), enables the gap density in the high-strength galvanized steel sheet to be adjusted to be within the desired range. The bend angle is preferably 60° to 180°. If any of the above temperature, the above bend radius, and the above number of time the steel sheet is bent and unbent deviates from the specified range, the desired gap density may fail to be achieved and, consequently, the bendability and impact resistance of the steel sheet may become degraded. The bending and unbending of the steel sheet needs to be performed over the entirety of the steel sheet. It is preferable to bend and unbend the steel sheet with rollers while the steel sheet is transported with the rollers such that the entirety of the steel sheet is bent and unbent. The Ms point is the temperature at which martensite transformation starts and is determined with Formaster.

After the steel sheet has been bent and unbent, the steel sheet is cooled to 50° C. or less. It is necessary to cool the steel sheet to 50° C. or less in order to perform oiling and the like subsequently. The cooling rate at which the steel sheet is cooled is not limited but normally set such that an average cooling rate of 1 to 100° C./s is achieved.

It is preferable to perform temper rolling after the steel sheet has been cooled and bend and unbend the tempered steel sheet in a direction perpendicular to the rolling direction at a bend radius of 500 mm or less, each of the bending and the unbending being performed 3 times or more. The three or more cycles of bending and unbending may further increase the gap density and thereby further enhance the bendability and impact resistance of the steel sheet. The above advantageous effects may fail to be achieved if the above bend-unbend treatment in a temperature range of Ms to Ms −200° C. is not performed appropriately. Alternatively, only the temper rolling may be performed after the steel sheet has been cooled.

EXAMPLES

Steels having the compositions described in Table 1 were prepared in a converter and subsequently formed into slabs by continuous casting. The slabs were heated to 1200° C. and then subjected to rough rolling and finish rolling. Hereby, hot-rolled steel sheets having a thickness of 3.0 mm were prepared. In the hot-rolling process, the finish rolling temperature was 900° C. and the coiling temperature was 500° C. After the hot-rolled steel sheets had been pickled, the steel sheets were partially cold-rolled to a thickness of 1.4 mm. The cold-rolled steel sheets were annealed (Steel sheet No. 9 was reheated at a heating temperature of Ms to 600° C. such that the amount of residence time during which the temperature was maintained in the temperature range of Ms to 600° C. was 1 to 100 seconds). The annealing of the steel sheets was performed using a continuous hot-dip galvanizing line under the conditions described in Table 2. Hereby, hot-galvanized and alloyed hot-galvanized steel sheets 1 to 23 were prepared. The galvanized steel sheets (GI) were prepared by dipping the annealed steel sheets in a plating bath having a temperature of 460° C. and thereby depositing a plating layer on each of the steel sheets in an amount of 35 to 45 g/m². The alloyed galvanized steel sheets (GA) were prepared by subjecting the plated steel sheets to an alloying treatment in which the plated steel sheets were maintained at 460° C. to 600° C. for 1 to 60 s. The plated steel sheets were bent and unbent under the conditions described in Table 2 and subsequently cooled to 50° C. or less. In some of the examples, the steel sheets were bent and unbent after the steel sheets had been subjected to temper rolling at an elongation rate of 0.3%. When the steel sheets were bent and unbent, rollers were used such that the entirety of each of the steel sheets was bent and unbent. The microstructure, tensile properties, and bendability of each of the steel sheets were evaluated in accordance with the following test methods. The impact resistance of each of the steel sheets that had been subjected to a tensile test was also evaluated in accordance with the following test method.

Observation of Microstructure (Area Fractions of Phases)

The term "area fraction" of ferrite, martensite, or bainite refers to the ratio of the area of the microstructure component to the area of observation. The above area fractions are determined by the following method: taking a sample from each of the annealed steel sheets; grinding a cross section of the sample which is taken in the thickness direction of the steel sheet so as to be parallel to the rolling direction; performing corrosion with 3% nital; capturing an image of the cross section at a position 1/4 from the surface in the thickness direction with a SEM (scanning electron microscope) at 1500-fold magnification in 3 fields of view; determining the area fractions of the microstructure components with Image-Pro produced by Media Cybernetics, Inc on the basis of the images; and calculating the average of the area fractions of each of the microstructure components in the three fields of view as the area fraction of the microstructure component. In the images, the microstructure components can be distinguished from one another because ferrite appears black, martensite and retained austenite appears white or light gray, and bainite appear black or dark gray that includes oriented carbide particles, island-like martensite, or both oriented carbide particles and island-like martensite (it is possible to distinguish carbide-free bainite and carbide-containing bainite from each other since the grain boundary of bainite can be determined. Island-like martensite is the portions of the image which appear white or light gray as illustrated in FIG. 1). In the present disclosure, the area fraction of bainite is the area fraction of the black or dark gray portion excluding the white or light gray portion included in bainite. The area fraction of martensite was determined by subtracting the area fraction of retained austenite (the volume fraction of retained austenite was considered as area fraction) described below from the area fraction of the white or light gray microstructure component. In the present disclosure, martensite may be carbide-containing auto-tempered martensite or tempered-martensite. In the carbide-containing martensite, carbide particles are not aligned in a specific orientation unlike bainite. The island-like martensite is martensite having any of the above properties. In the present disclosure, white portions that do not have a dot-like or linear shape were distinguished as the above martensite or retained austenite. Although pearlite is not always included in the steel sheet according to the present disclosure, pearlite can be distinguished as a black and white, lamellar microstructure.

The volume fraction of retained austenite was determined by the following method: grinding each of the annealed steel sheets to a depth 1/4 the thickness of the steel sheet; further grinding the resulting cross section 0.1 mm by chemical grinding; measuring the integrated reflection intensities on the (200), (220), and (311) planes of fcc iron (austenite) and the (200), (211), and (220) planes of bcc iron (ferrite) with an X-ray diffraction apparatus using Mo-Ka radiation; and determining the volume fraction of retained austenite on the basis of the ratio of the integrated reflection intensities measured on the above planes of fcc iron to the integrated reflection intensities measured on the above planes of bcc iron.

In the table, "V(F+B1)" denotes the total area fraction of ferrite and carbide-free bainite; "V(M+B2)" denotes the total area fraction of martensite and carbide-containing bainite; "V(γ)" denotes the area fraction of retained austenite; and "Others" denotes the area fraction of the other phases.

Microstructure Observation (Gap Density)

Figure 2:
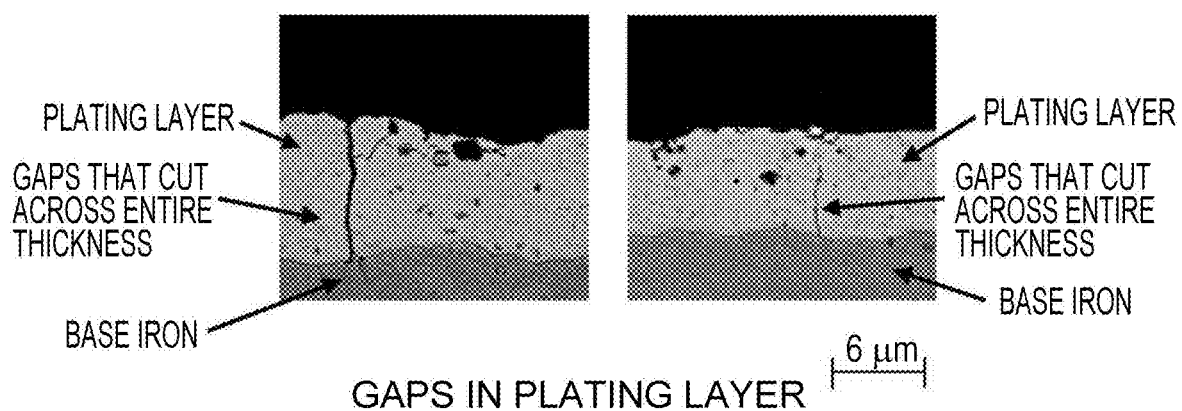
FIG. 2 includes example images illustrating gaps formed in a plating layer.

An image of a cross section of the galvanizing layer taken in the thickness direction so as to be perpendicular to the rolling direction, the image covering a region of the cross section which is in the vicinity of the surface layer, was captured with an SEM at 3000-fold magnification in 30 fields of view. The gap density was determined by dividing the number of gaps that were present in the fields of view and cut across the entire thickness of the galvanizing layer by the total length of the surfaces of the steel sheet which are observed in the fields of view. An evaluation of "Passed" was given when the gap density was 10 gaps/mm or more. FIG. 2 illustrates an example of the images.

Microstructure Observation (Density of Carbide in Surface Layer)

The density of carbide in the surface layer (the density of carbide particles having a size of 0.5 μm or more in a region of a cross section of the galvanizing layer which is taken in the thickness direction so as to be perpendicular to the rolling direction, the region extending from the surface of the steel sheet (i.e., the interface between the steel sheet and the plating layer) to a depth of 10 μm in the thickness direction) was determined by the following method: observing carbide particles with an SEM at 1500-fold magnification in 5 fields of view; determining the number of particles having a size of 0.5 μm or more in the fields of view; and dividing the number of the particles by the total area of the regions extending from the surface of the steel sheet to a depth of 10 μm in the thickness direction which were included in the fields of view.

Tensile Test

A JIS No. 5 tensile test specimen (JIS Z 2201) was taken from each of the annealed steel sheets in a direction perpendicular to the rolling direction. The specimen was subjected to a tensile test conforming to JIS Z 2241 with a strain rate of $10^{-3}$/s in order to determine the TS of the steel sheet. In the present disclosure, an evaluation of "Passed" was given when a TS of 1180 MPa or more was achieved.

Impact Resistance

After the test specimen had been elongated to a strain of 1% by a tensile test similar to the above tensile test, a tensile test was conducted at a strain rate of 2000/s with a test specimen including a parallel portion having a width of 5 mm and a length of 7 mm from the center of the test specimen. The evaluation was made on the basis of the amount of energy AE1 absorbed until a strain of 5% was achieved (Tetsu-to-Hagane (iron and steel), 83 (1997), P. 748). The amount of absorbed energy was determined by integrating the stress-true strain curve from 0% to 5% with respect to strain. An evaluation of "Passed" was given when the ratio (AE1/TS) of the absorbed energy AE1 to the TS measured in the above tensile test was 0.050 or more. In the above evaluation, whether or not the steel sheet has excellent post-work impact resistance can be determined.

Bendability

A strip-shaped test specimen having a width of 30 mm and a length of 100 mm was taken from each of the annealed steel sheets such that the test specimen was bent in a direction parallel to the rolling direction in the bend test. The test specimen was subjected to the following bend test. Specifically, a 90°-V bending test was conducted with a stroke speed of 10 mm/s, an indentation load of 10 ton, and an indentation holding time of 5 seconds, and the ridge line formed at the vertex of the bent portion was observed with a 10-fold magnifier. The minimum bend radius at which cracks having a length of 0.5 mm or more were not formed was determined. An evaluation of "Passed" was given when the R/t value calculated by dividing the above minimum bend radius by the thickness of the steel sheet was 2.5 or less.

Properties After Bending

Each of the steel sheets was bent by the same method as in the evaluation of bendability under the following conditions: bend angle: 90°, temperature: 45° C., bend radius: 5 mm. A sample was taken from the bent portion at a position that was the center of a ridge line of the bent portion in a width direction. An image of a cross section of the sample which was taken in the thickness direction so as to be perpendicular to the ridge line of the bent portion, the image covering a region of the cross section which was in the vicinity of the vertex of the bent portion, was captured with an SEM at 3000-fold magnification in 30 fields of view. The gap density was determined by dividing the number of gaps that were present in the fields of view and cut across the entire thickness of the galvanizing layer by the total length of the surfaces of the steel sheet which were observed in the fields of view. An evaluation of "Passed" was given when the gap density was 50 gaps/mm or more. A Vickers hardness of the sample at a position 50 μm from the surface of the steel sheet in the thickness direction was measured with a load of 50 gf for 5 points in the cross section of the sample. The average of the three Vickers hardness values other than the maximum or minimum was calculated. The average Vickers hardness was considered to be the Vickers hardness HV of the bent portion at a position 50 μm from the surface in the thickness direction (i.e., bent portion HV). An evaluation of "Passed" was given when the Vickers hardness HV was 350 or more.

Table 3 summarizes the results.

TABLE 1

| | Composition (mass %) | | | | | | | | |
|---|---|---|---|---|---|---|---|---|---|
| Steel | C | Si | Mn | P | S | Al | N | Others | Remark |
| A | 0.10 | 0.50 | 3.5 | 0.015 | 0.002 | 0.030 | 0.003 | — | Within the scope of disclosure |
| B | 0.15 | 1.00 | 3.0 | 0.015 | 0.002 | 0.030 | 0.003 | — | Within the scope of disclosure |
| C | 0.20 | 1.50 | 2.5 | 0.015 | 0.002 | 0.030 | 0.003 | — | Within the scope of disclosure |
| D | 0.10 | 0.50 | 2.5 | 0.015 | 0.002 | 0.030 | 0.003 | Cr: 0.5, Nb: 0.03, Mo: 0.1, B: 0.0010 | Within the scope of disclosure |
| E | 0.15 | 0.50 | 2.5 | 0.015 | 0.002 | 0.030 | 0.003 | Ti: 0.02, Mo: 0.2, B: 0.0020 | Within the scope of disclosure |
| F | 0.10 | 1.00 | 2.5 | 0.015 | 0.002 | 0.030 | 0.003 | Ni: 0.5 | Within the scope of disclosure |
| G | 0.15 | 0.10 | 3.0 | 0.015 | 0.002 | 0.030 | 0.003 | Mo: 0.1, V: 0.05, Cu: 0.2, Ca: 0.0010 | Within the scope of disclosure |
| H | 0.15 | 0.20 | 2.5 | 0.015 | 0.002 | 0.030 | 0.003 | Cr: 0.5, Nb: 0.03, Ti: 0.01, B: 0.0010 | Within the scope of disclosure |
| I | 0.15 | 1.00 | 2.0 | 0.015 | 0.002 | 0.030 | 0.003 | Cr: 1.0, Ti: 0.02, B: 0.0020, Sb: 0.01 | Within the scope of disclosure |
| J | 0.15 | 1.00 | 2.5 | 0.015 | 0.002 | 0.030 | 0.003 | Mo: 0.2, Sn: 0.05, REM: 0.002 | Within the scope of disclosure |
| K | 0.04 | 1.00 | 2.5 | 0.015 | 0.002 | 0.030 | 0.003 | Ti: 0.02, Mo: 0.2, B: 0.0020 | Outside the scope of disclosure |
| L | 0.35 | 0.50 | 2.5 | 0.015 | 0.002 | 0.030 | 0.003 | | Outside the scope of disclosure |
| M | 0.15 | 3.20 | 2.5 | 0.015 | 0.002 | 0.030 | 0.003 | Ni: 0.3, Ti: 0.02, V: 0.10, REM: 0.002 | Outside the scope of disclosure |

TABLE 1-continued

| | Composition (mass %) | | | | | | | | |
|---|---|---|---|---|---|---|---|---|---|
| Steel | C | Si | Mn | P | S | Al | N | Others | Remark |
| N | 0.15 | 0.20 | <u>1.4</u> | 0.015 | 0.002 | 0.030 | 0.003 | Mo: 0.1, V: 0.05, Cu: 0.2, Ca: 0.0010 | Outside the scope of disclosure |
| O | 0.15 | 0.50 | <u>4.5</u> | 0.015 | 0.002 | 0.030 | 0.003 | | Outside the scope of disclosure |
| P | 0.15 | 0.01 | 2.6 | 0.015 | 0.002 | <u>1.500</u> | 0.003 | | Outside the scope of disclosure |

*The underlined values are outside the scope of the present disclosure

TABLE 2

| Steel sheet No. | Steel | Cold rolling | Annealing temperature (° C.) | H₂O concentration in temperature range of 750° C. to 900° C. (ppm) | Average cooling rate at 550° C. to 700° C. (° C./s) | Annealing holding time (s) | Cooling stop temperature (° C.) | Reheating temperature (° C.) | Holding time (s) | Ms point (° C.) | Bend-unbend temperature (° C.) |
|---|---|---|---|---|---|---|---|---|---|---|---|
| 1 | A | Yes | 810 | 2000 | 12 | 150 | 500 | — | 200 | 360 | 300 |
| 2 | | | <u>730</u> | 2000 | 12 | 150 | 500 | — | 200 | 242 | 200 |
| 3 | | | 810 | 1500 | 25 | <u>25</u> | 500 | — | 25 | 323 | 300 |
| 4 | | | 810 | 2000 | <u>1</u> | 750 | 550 | — | 1000 | 325 | 300 |
| 5 | B | Yes | 810 | 1000 | 10 | 60 | 500 | — | 60 | 355 | 300 |
| 6 | | | 810 | 1000 | 15 | 40 | 500 | — | 40 | 353 | <u>380</u> |
| 7 | | | 810 | 300 | 4 | 200 | 500 | — | 200 | 355 | <u>150</u> |
| 8 | | | 800 | 1000 | 12 | 480 | 500 | — | 50 | 353 | 300 |
| 9 | C | No | 830 | 300 | 10 | 60 | 350 | 400 | 60 | 341 | 300 |
| 10 | | | 830 | 500 | 8 | 100 | 500 | — | 30 | 341 | 300 |
| 11 | D | Yes | 810 | 3000 | 12 | 120 | 500 | — | 50 | 384 | 250 |
| 12 | E | Yes | 810 | 2000 | 12 | 120 | 500 | — | 200 | 387 | 300 |
| 13 | F | Yes | 810 | 2000 | 12 | 150 | 500 | — | 200 | 383 | 300 |
| 14 | G | Yes | 790 | 2000 | 12 | 120 | 500 | — | 200 | 352 | 300 |
| 15 | H | Yes | 810 | 1000 | 12 | 120 | 500 | — | 200 | 381 | 300 |
| 16 | I | Yes | 810 | 1000 | 10 | 60 | 500 | — | 60 | 378 | 300 |
| 17 | J | Yes | 880 | 1000 | 10 | 60 | 500 | — | 60 | 398 | 300 |
| 18 | <u>K</u> | Yes | 810 | 2500 | 12 | 120 | 500 | — | 200 | 401 | 300 |
| 19 | <u>L</u> | Yes | 800 | 1000 | 12 | 120 | 500 | — | 200 | 304 | 300 |
| 20 | <u>M</u> | Yes | 900 | 1000 | 12 | 120 | 500 | — | 200 | 369 | 300 |
| 21 | <u>N</u> | Yes | 810 | 3000 | 12 | 120 | 500 | — | 200 | 302 | 300 |
| 22 | <u>O</u> | Yes | 810 | 1000 | 12 | 120 | 500 | — | 200 | 320 | 300 |
| 23 | <u>P</u> | Yes | 790 | 1000 | 12 | 120 | 500 | — | 200 | 373 | 300 |
| 24 | A | Yes | 810 | 400 | 12 | 150 | 500 | — | 200 | 360 | 300 |

| | | | | | After tempering | | | | | | |
| Steel sheet No. | Ms point − 200 (° C.) | Bend radius (mm) | Number of times steel sheet was bent (times) | Number of times steel sheet was unbent (times) | Number of times steel sheet was bent (times) | Number of times steel sheet was unbent (times) | Bend radius (mm) | Plating conditions | Remarks |
|---|---|---|---|---|---|---|---|---|---|
| 1 | 160 | 800 | 3 | 3 | 0 | 0 | 500 | GA | Example |
| 2 | 42 | 800 | 3 | 3 | 0 | 0 | 500 | GA | Comparative example |
| 3 | 123 | 800 | 2 | 2 | 12 | 12 | 500 | GA | Comparative example |
| 4 | 125 | 800 | 3 | 3 | 0 | 0 | 500 | GA | Comparative example |
| 5 | 155 | 800 | 2 | 2 | 12 | 12 | 500 | GA | Example |
| 6 | 153 | 800 | 2 | 2 | 12 | 12 | 500 | GA | Comparative example |
| 7 | 155 | 800 | 2 | 2 | 12 | 12 | 500 | GA | Comparative example |
| 8 | 153 | <u>1250</u> | 3 | 3 | 20 | 20 | 500 | GA | Comparative example |
| 9 | 141 | 800 | 2 | 2 | 12 | 12 | 500 | GA | Example |
| 10 | 141 | <u>400</u> | 2 | 2 | 16 | 16 | 500 | GA | Comparative example |
| 11 | 184 | 800 | 3 | 3 | 12 | 12 | 500 | GA | Example |
| 12 | 187 | 800 | 2 | 2 | 8 | 8 | 500 | GA | Example |
| 13 | 183 | 800 | 3 | 3 | 0 | 0 | 500 | GI | Example |
| 14 | 152 | 800 | 2 | 2 | 8 | 8 | 500 | GA | Example |
| 15 | 181 | 800 | 2 | 2 | 8 | 8 | 500 | GA | Example |
| 16 | 178 | 800 | 2 | 2 | 12 | 12 | 500 | GA | Example |
| 17 | 198 | 800 | 2 | 2 | 12 | 12 | 500 | GA | Example |
| 18 | 201 | 800 | 2 | 2 | 0 | 0 | 500 | GA | Comparative example |

TABLE 2-continued

| | | | | | | | | | |
|---|---|---|---|---|---|---|---|---|---|
| 19 | 104 | 800 | 2 | 2 | 0 | 0 | 500 | GA | Comparative example |
| 20 | 169 | 800 | 2 | 2 | 0 | 0 | 500 | GA | Comparative example |
| 21 | 102 | 800 | 2 | 2 | 0 | 0 | 500 | GA | Comparative example |
| 22 | 120 | 800 | 2 | 2 | 0 | 0 | 500 | GA | Comparative example |
| 23 | 173 | 800 | 2 | 2 | 0 | 0 | 500 | GA | Comparative example |
| 24 | 160 | 800 | 3 | 3 | 0 | 0 | 500 | GA | Example |

*The underlined values are outside the scope of the present disclosure

TABLE 3

| | Microstructure | | | | Plating layer | | |
|---|---|---|---|---|---|---|---|
| Steel No. | V (F + B1) (%) | V (M + B2) (%) | V (γ) (%) | Others (%) | Density of carbide in surface layer ($10^5$ particles/mm$^2$) | Density of gaps in original sheet (gaps/mm) | Density of gaps in bent portion (gaps/mm) |
| 1 | 33 | 66 | 1 | 0 | 0.6 | 13 | 59 |
| 2 | _79_ | _16_ | 5 | 0 | 0.3 | 10 | 52 |
| 3 | _60_ | _38_ | 2 | 0 | 0.6 | 11 | 58 |
| 4 | _59_ | _40_ | 1 | 0 | 0.3 | 11 | 55 |
| 5 | 31 | 68 | 1 | 0 | 0.3 | 21 | 85 |
| 6 | 32 | 67 | 1 | 0 | 0.8 | _9_ | _44_ |
| 7 | 31 | 68 | 1 | 0 | 1.6 | _8_ | _43_ |
| 8 | 32 | 68 | 0 | 0 | 0.7 | _9_ | _46_ |
| 9 | 35 | 65 | 0 | 0 | 1.5 | 23 | 86 |
| 10 | 35 | 65 | 0 | 0 | 0.9 | _9_ | _48_ |
| 11 | 38 | 61 | 1 | 0 | 0.04 | 13 | 65 |
| 12 | 17 | 83 | 0 | 0 | 0.1 | 17 | 74 |
| 13 | 48 | 51 | 1 | 0 | 0.8 | 11 | 52 |
| 14 | 33 | 67 | 0 | 0 | 0.2 | 16 | 77 |
| 15 | 12 | 88 | 0 | 0 | 0.2 | 16 | 69 |
| 16 | 27 | 73 | 0 | 0 | 0.5 | 22 | 80 |
| 17 | 1 | 99 | 0 | 0 | 0.6 | 28 | 84 |
| 18 | _72_ | _23_ | 5 | 0 | 0.2 | 11 | 59 |
| 19 | 15 | 85 | 0 | 0 | 0.5 | 14 | 67 |
| 20 | 16 | 84 | 0 | 0 | 0.5 | 14 | 61 |
| 21 | _72_ | _25_ | 3 | 0 | 0.06 | 11 | 52 |
| 22 | _0_ | 92 | _8_ | 0 | 0.6 | 16 | 61 |
| 23 | 55 | _41_ | 4 | 0 | 0.7 | 12 | 57 |
| 24 | 34 | 64 | 2 | 0 | 1.5 | 13 | 60 |

| | Mechanical properties | | | | | |
|---|---|---|---|---|---|---|
| Steel No. | Bent portion HV | TS (MPa) | R/t | AE1 (MJ/m$^3$) | AE1/TS | Remarks |
| 1 | 394 | 1189 | 2.1 | 68 | 0.057 | Example |
| 2 | 255 | 823 | 0.9 | 37 | 0.045 | Comparative example |
| 3 | 347 | 1109 | 1.8 | 53 | 0.048 | Comparative example |
| 4 | 348 | 1112 | 1.4 | 54 | 0.049 | Comparative example |
| 5 | 412 | 1315 | 2.5 | 87 | 0.066 | Example |
| 6 | 411 | 1310 | 2.9 | 59 | 0.045 | Comparative example |
| 7 | 415 | 1322 | 3.9 | 44 | 0.033 | Comparative example |
| 8 | 415 | 1319 | 3.2 | 58 | 0.044 | Comparative example |
| 9 | 440 | 1456 | 2.5 | 93 | 0.064 | Example |
| 10 | 438 | 1444 | 3.2 | 58 | 0.040 | Comparative example |
| 11 | 395 | 1201 | 2.1 | 70 | 0.058 | Example |
| 12 | 420 | 1378 | 2.5 | 84 | 0.061 | Example |
| 13 | 396 | 1185 | 2.1 | 65 | 0.055 | Example |
| 14 | 410 | 1338 | 2.1 | 84 | 0.063 | Example |
| 15 | 431 | 1390 | 2.1 | 83 | 0.060 | Example |
| 16 | 413 | 1362 | 2.1 | 83 | 0.061 | Example |
| 17 | 433 | 1433 | 2.1 | 97 | 0.068 | Example |
| 18 | 240 | 775 | 1.1 | 38 | 0.049 | Comparative example |
| 19 | 539 | 1864 | >7.1 | 69 | 0.037 | Comparative example |
| 20 | 444 | 1466 | 2.5 | 59 | 0.040 | Comparative example |
| 21 | 244 | 801 | 0.7 | 36 | 0.045 | Comparative example |
| 22 | 431 | 1402 | 2.5 | 56 | 0.040 | Comparative example |
| 23 | 349 | 1164 | 1.8 | 57 | 0.049 | Comparative example |
| 24 | 395 | 1193 | 2.5 | 64 | 0.054 | Example |

*The underlined values are outside the scope of the present disclosure

The steel sheets prepared in the disclosed Examples were high-strength steel sheets having excellent bendability and excellent post-work impact resistance. In contrast, the steel sheets prepared in Comparative examples, which were outside the scope of the present disclosure, did not achieve one or more of the desired strength, the desired bendability, and the desired post-work impact resistance.

INDUSTRIAL APPLICABILITY

According to the present disclosure, a steel sheet for high-strength members which has a TS of 1180 MPa or more and excellent impact resistance and a high-strength galvanized steel sheet having excellent bendability and excellent post-work impact resistance may be produced. Using the high-strength member and the high-strength steel sheet according to the present disclosure for producing automotive components may markedly improve the collision safety and the fuel economy of automobiles.

The invention claimed is:

1. A high-strength galvanized steel sheet comprising:
a steel sheet having a composition comprising:
C: 0.05% to 0.30%, by mass %;
Si: 3.0% or less, by mass %;
Mn: 1.5% to 4.0%, by mass %;
P: 0.100% or less, by mass %;
S: 0.02% or less, by mass %;
Al: 1.0% or less, by mass %; and
Fe and inevitable impurities; and
a galvanizing layer disposed on the steel sheet, wherein:
the steel sheet has a tensile strength (TS) of 1180 MPa or more,
the steel sheet has a microstructure in which:
the total area fraction of ferrite and carbide-free bainite is 0% to 55%,
the total area fraction of martensite and carbide-containing bainite is 51% to 100%, and
the area fraction of retained austenite is 0% to 5%, and
a density of gaps that cut across an entire thickness of the galvanizing layer in a cross section of the galvanizing layer, the cross section being taken in a thickness direction of the steel sheet so as to be perpendicular to a rolling direction of the steel sheet, is 10 gaps/mm or more.

2. The high-strength galvanized steel sheet according to claim 1, wherein the composition further comprises one or more selected from:
Cr: 0.005% to 2.0%, by mass %;
Mo: 0.005% to 2.0%, by mass %;
V: 0.005% to 2.0%, by mass %;
Ni: 0.005% to 2.0%, by mass %;
Cu: 0.005% to 2.0%, by mass %;
Nb: 0.005% to 0.20%, by mass %;
Ti: 0.005% to 0.20%, by mass %;
B: 0.0001% to 0.0050%, by mass %;
Ca: 0.0001% to 0.0050%, by mass %;
REM: 0.0001% to 0.0050%, by mass %;
Sb: 0.0010% to 0.10%, by mass %; and
Sn: 0.0010% to 0.50%, by mass %.

3. The high-strength galvanized steel sheet according to claim 1, wherein the density of carbide particles having an equivalent circle diameter of 0.5 µm or more in a region of the steel sheet, the region extending from a surface of the steel sheet to a depth of 10 µm in the thickness direction, is $10^5$ particles/mm$^2$ or less.

4. The high-strength galvanized steel sheet according to claim 1, wherein the galvanizing layer is an alloyed galvanizing layer.

5. A high-strength member comprising a bent portion formed by bending the high-strength galvanized steel sheet according to claim 1, wherein:
a Vickers hardness HV of the bent portion, at a position 50 µm from a surface of the steel sheet in a thickness direction of the steel sheet, is 350 or more, the Vickers hardness HV being measured by the measurement method below, and
the density of gaps that cut across the entire thickness of the galvanizing layer in a cross section of the bent portion, the cross section being taken in the thickness direction of the steel sheet so as to be perpendicular to a rolling direction of the steel sheet, is 50 gaps/mm or more,
measurement method:
a sample is taken from the bent portion at a position that is a center of a ridge line of the bent portion in a width direction, the Vickers hardness of the sample at a position 50 µm from the surface of the steel sheet in the thickness direction is measured with a load of 50 gf for 5 points in a cross section of the sample, the cross section being taken in the thickness direction so as to be perpendicular to the ridge line, and an average of the three Vickers hardness values other than the maximum or minimum is calculated.

6. A method of producing a high-strength galvanized steel sheet according to claim 1, the method comprising:
an annealing step in which a hot-rolled or cold-rolled steel sheet having the composition is heated at a heating temperature of 750° C. or more and subsequently cooled such that an average cooling rate in a temperature range of 550° C. to 700° C. is 3° C./s or more, an amount of residence time during which the steel sheet is maintained at 750° C. or more during the heating and the cooling being 30 seconds or more;
a galvanizing step in which, subsequent to the annealing step, the annealed steel sheet is galvanized and subsequently, as needed, subjected to an alloying treatment; and
a bending-unbending step in which the galvanized steel sheet is bent and unbent in a direction perpendicular to a rolling direction of the steel sheet at a bend radius of 500 to 1000 mm in a temperature range of Ms to Ms −200° C. during cooling performed subsequent to the galvanizing step, each of the bending and the unbending being performed once or more, and the steel sheet is subsequently cooled to 50° C. or less.

7. The method according to claim 6, the method further comprising:
a temper rolling step in which, subsequent to the bending-unbending step, temper rolling is performed; and
a second bending-unbending step in which, subsequent to the temper rolling, the steel sheet is bent and unbent in a direction perpendicular to the rolling direction at a bend radius of 500 mm or less, each of the bending and the unbending being performed 3 times or more.

8. The method according to claim 6, wherein, in the annealing step, the H$_2$O concentration in a furnace atmosphere in a temperature range of 750° C. to 900° C. is 500 to 5000 ppm.

9. The high-strength galvanized steel sheet according to claim 2, wherein the density of carbide particles having an equivalent circle diameter of 0.5 µm or more in a region of the steel sheet, the region extending from a surface of the steel sheet to a depth of 10 µm in the thickness direction, is $10^5$ particles/mm² or less.

10. The high-strength galvanized steel sheet according to claim 2, wherein the galvanizing layer is an alloyed galvanizing layer.

11. The high-strength galvanized steel sheet according to claim 3, wherein the galvanizing layer is an alloyed galvanizing layer.

12. The high-strength galvanized steel sheet according to claim 9, wherein the galvanizing layer is an alloyed galvanizing layer.

13. A high-strength member comprising a bent portion formed by bending the high-strength galvanized steel sheet according to claim 2, wherein:
   a Vickers hardness HV of the bent portion, at a position 50 µm from a surface of the steel sheet in a thickness direction of the steel sheet, is 350 or more, the Vickers hardness HV being measured by the measurement method below, and
   the density of gaps that cut across the entire thickness of the galvanizing layer in a cross section of the bent portion, the cross section being taken in the thickness direction of the steel sheet so as to be perpendicular to a rolling direction of the steel sheet, is 50 gaps/mm or more,
   measurement method:
      a sample is taken from the bent portion at a position that is a center of a ridge line of the bent portion in a width direction, the Vickers hardness of the sample at a position 50 µm from the surface of the steel sheet in the thickness direction is measured with a load of 50 gf for 5 points in a cross section of the sample, the cross section being taken in the thickness direction so as to be perpendicular to the ridge line, and an average of the three Vickers hardness values other than the maximum or minimum is calculated.

14. A high-strength member comprising a bent portion formed by bending the high-strength galvanized steel sheet according to claim 3, wherein:
   a Vickers hardness HV of the bent portion, at a position 50 µm from a surface of the steel sheet in a thickness direction of the steel sheet, is 350 or more, the Vickers hardness HV being measured by the measurement method below, and
   the density of gaps that cut across the entire thickness of the galvanizing layer in a cross section of the bent portion, the cross section being taken in the thickness direction of the steel sheet so as to be perpendicular to a rolling direction of the steel sheet, is 50 gaps/mm or more,
   measurement method:
      a sample is taken from the bent portion at a position that is a center of a ridge line of the bent portion in a width direction, the Vickers hardness of the sample at a position 50 µm from the surface of the steel sheet in the thickness direction is measured with a load of 50 gf for 5 points in a cross section of the sample, the cross section being taken in the thickness direction so as to be perpendicular to the ridge line, and an average of the three Vickers hardness values other than the maximum or minimum is calculated.

15. A high-strength member comprising a bent portion formed by bending the high-strength galvanized steel sheet according to claim 9, wherein:
   a Vickers hardness HV of the bent portion, at a position 50 µm from a surface of the steel sheet in a thickness direction of the steel sheet, is 350 or more, the Vickers hardness HV being measured by the measurement method below, and
   the density of gaps that cut across the entire thickness of the galvanizing layer in a cross section of the bent portion, the cross section being taken in the thickness direction of the steel sheet so as to be perpendicular to a rolling direction of the steel sheet, is 50 gaps/mm or more,
   measurement method:
      a sample is taken from the bent portion at a position that is a center of a ridge line of the bent portion in a width direction, the Vickers hardness of the sample at a position 50 µm from the surface of the steel sheet in the thickness direction is measured with a load of 50 gf for 5 points in a cross section of the sample, the cross section being taken in the thickness direction so as to be perpendicular to the ridge line, and an average of the three Vickers hardness values other than the maximum or minimum is calculated.

16. A high-strength member comprising a bent portion formed by bending the high-strength galvanized steel sheet according to claim 4, wherein:
   a Vickers hardness HV of the bent portion, at a position 50 µm from a surface of the steel sheet in a thickness direction of the steel sheet, is 350 or more, the Vickers hardness HV being measured by the measurement method below, and
   the density of gaps that cut across the entire thickness of the galvanizing layer in a cross section of the bent portion, the cross section being taken in the thickness direction of the steel sheet so as to be perpendicular to a rolling direction of the steel sheet, is 50 gaps/mm or more,
   measurement method:
      a sample is taken from the bent portion at a position that is a center of a ridge line of the bent portion in a width direction, the Vickers hardness of the sample at a position 50 µm from the surface of the steel sheet in the thickness direction is measured with a load of 50 gf for 5 points in a cross section of the sample, the cross section being taken in the thickness direction so as to be perpendicular to the ridge line, and an average of the three Vickers hardness values other than the maximum or minimum is calculated.

17. A high-strength member comprising a bent portion formed by bending the high-strength galvanized steel sheet according to claim 10, wherein:
   a Vickers hardness HV of the bent portion, at a position 50 µm from a surface of the steel sheet in a thickness direction of the steel sheet, is 350 or more, the Vickers hardness HV being measured by the measurement method below, and
   the density of gaps that cut across the entire thickness of the galvanizing layer in a cross section of the bent portion, the cross section being taken in the thickness direction of the steel sheet so as to be perpendicular to a rolling direction of the steel sheet, is 50 gaps/mm or more,
   measurement method:
      a sample is taken from the bent portion at a position that is a center of a ridge line of the bent portion in a width direction, the Vickers hardness of the sample at a position 50 µm from the surface of the steel sheet in the thickness direction is measured with a load of 50 gf for 5 points in a cross section of the sample, the cross section being taken in the thickness direction so as to be perpendicular to the ridge line, and an average of the three Vickers hardness values other than the maximum or minimum is calculated.

18. A high-strength member comprising a bent portion formed by bending the high-strength galvanized steel sheet according to claim 11, wherein:
    a Vickers hardness HV of the bent portion, at a position 50 μm from a surface of the steel sheet in a thickness direction of the steel sheet, is 350 or more, the Vickers hardness HV being measured by the measurement method below, and
    the density of gaps that cut across the entire thickness of the galvanizing layer in a cross section of the bent portion, the cross section being taken in the thickness direction of the steel sheet so as to be perpendicular to a rolling direction of the steel sheet, is 50 gaps/mm or more,
    measurement method:
        a sample is taken from the bent portion at a position that is a center of a ridge line of the bent portion in a width direction, the Vickers hardness of the sample at a position 50 μm from the surface of the steel sheet in the thickness direction is measured with a load of 50 gf for 5 points in a cross section of the sample, the cross section being taken in the thickness direction so as to be perpendicular to the ridge line, and an average of the three Vickers hardness values other than the maximum or minimum is calculated.

19. A high-strength member comprising a bent portion formed by bending the high-strength galvanized steel sheet according to claim 12, wherein:
    a Vickers hardness HV of the bent portion, at a position 50 μm from a surface of the steel sheet in a thickness direction of the steel sheet, is 350 or more, the Vickers hardness HV being measured by the measurement method below, and
    the density of gaps that cut across the entire thickness of the galvanizing layer in a cross section of the bent portion, the cross section being taken in the thickness direction of the steel sheet so as to be perpendicular to a rolling direction of the steel sheet, is 50 gaps/mm or more,
    measurement method:
        a sample is taken from the bent portion at a position that is a center of a ridge line of the bent portion in a width direction, the Vickers hardness of the sample at a position 50 μm from the surface of the steel sheet in the thickness direction is measured with a load of 50 gf for 5 points in a cross section of the sample, the cross section being taken in the thickness direction so as to be perpendicular to the ridge line, and an average of the three Vickers hardness values other than the maximum or minimum is calculated.

20. A method of producing a high-strength galvanized steel sheet according to claim 2, the method comprising:
    an annealing step in which a hot-rolled or cold-rolled steel sheet having the composition is heated at a heating temperature of 750° C. or more and subsequently cooled such that an average cooling rate in a temperature range of 550° C. to 700° C. is 3° C./s or more, an amount of residence time during which the steel sheet is maintained at 750° C. or more during the heating and the cooling being 30 seconds or more;
    a galvanizing step in which, subsequent to the annealing step, the annealed steel sheet is galvanized and subsequently, as needed, subjected to an alloying treatment; and
    a bending-unbending step in which the galvanized steel sheet is bent and unbent in a direction perpendicular to a rolling direction of the steel sheet at a bend radius of 500 to 1000 mm in a temperature range of Ms to Ms −200° C. during cooling performed subsequent to the galvanizing step, each of the bending and the unbending being performed once or more, and the steel sheet is subsequently cooled to 50° C. or less.

21. The method according to claim 20, the method further comprising:
    a temper rolling step in which, subsequent to the bending-unbending step, temper rolling is performed; and
    a second bending-unbending step in which, subsequent to the temper rolling, the steel sheet is bent and unbent in a direction perpendicular to the rolling direction at a bend radius of 500 mm or less, each of the bending and the unbending being performed 3 times or more.

22. The method according to claim 20, wherein, in the annealing step, the $H_2O$ concentration in a furnace atmosphere in a temperature range of 750° C. to 900° C. is 500 to 5000 ppm.

23. The method according to claim 7, wherein, in the annealing step, the $H_2O$ concentration in a furnace atmosphere in a temperature range of 750° C. to 900° C. is 500 to 5000 ppm.

24. The method according to claim 21, wherein, in the annealing step, the $H_2O$ concentration in a furnace atmosphere in a temperature range of 750° C. to 900° C. is 500 to 5000 ppm.

25. The high-strength galvanized steel sheet according to claim 1, wherein the steel sheet has an impact resistance such that a ratio (AE1/TS) is 0.050 or more, wherein AE1 represents an amount of energy absorbed by a test specimen of the steel sheet elongated at a strain rate of 2000/s until a strain of 5% is achieved, after having been previously subjected to a strain of 1%, the test specimen having a thickness of 1.4 mm, a width of 5 mm, and a length of 7 mm.

26. The high-strength galvanized steel sheet according to claim 1, wherein the steel sheet has a bendability such that an R/t value is 2.5 or less, wherein R represents a minimum bend radius of a test specimen of the steel sheet at which cracks having a length of 0.5 mm or more are not formed when the test specimen is subjected to a 90°-V bending test conducted with a stroke speed of 10 mm/s, an indentation load of 10 ton, and an indentation holding time of 5 seconds, the test specimen having a thickness (t) of 1.4 mm, a width of 30 mm, and a length of 100 mm.

\* \* \* \* \*